United States Patent [19]

Arkell

[11] 3,836,890

[45] Sept. 17, 1974

[54] VISUAL DISPLAY SYSTEM

[75] Inventor: Frank J. Arkell, Scottsdale, Ariz.

[73] Assignee: Motorola, Inc., Franklin Park, Ill.

[22] Filed: Apr. 9, 1973

[21] Appl. No.: 349,908

[52] U.S. Cl. .......................... 340/172.5, 340/324 A

[51] Int. Cl. .......................... G06f 3/14

[58] Field of Search ...................... 340/172.5, 324 A

[56] References Cited

UNITED STATES PATENTS

| | | | |
|---|---|---|---|
| 3,406,387 | 10/1968 | Werme | 340/172.5 X |
| 3,500,336 | 3/1970 | Cuccio | 340/172.5 |
| 3,508,245 | 4/1970 | Purdy et al. | 340/324 A |
| 3,589,725 | 6/1971 | Townsend | 340/324 A |
| 3,755,790 | 8/1973 | Berger | 340/172.5 |

OTHER PUBLICATIONS

1971, Textronix Catalog, Frontispiece and pp. 77, 327–328, 346 and 347.

*Primary Examiner*—Harvey E. Springborn
*Attorney, Agent, or Firm*—Vincent J. Rauner; Victor Myer

[57] ABSTRACT

A visual display device adapted to perform a plurality of functions with the electronics for each function being incorporated into a separate module. A bus oriented receptacle, having a plurality of module receiving positions is connected to bus lines so that each module can be received in the receptacle in any of a plurality of positions and each module can be separately addressed by the visual display device as the function performed by each module is desired.

3 Claims, 3 Drawing Figures

VISUAL DISPLAY SYSTEM

BACKGROUND OF THE INVENTION

1. Field of the Invention

The present invention pertains to a visual display system such as utilized for displaying radar or sonar returns, maps, geometrical patterns, and/or any of a variety of functions including alphanumerics, tags, magnification, offset, etc.

2. Description of the Prior Art

In prior art visual display systems, general purpose displays are manufactured and sold that incorporate all of the functions which the subject display is capable of performing. The purchaser must then pay for all of the functions even though he only wishes to use a few. In some instances a cheaper model is constructed that performs only a few of the functions and the purchaser of this model does not have the capability of performing functions not originally incorporated in the display he purchased. That is, the display cannot be modified to incorporate additional functions after the original functions are hard wired into the circuit.

SUMMARY OF THE INVENTION

The present invention pertains to a visual display system including visual display means and a plurality of modules each incorporating circuits for performing a different function. The visual display means has a plurality of bus lines and a receptacle connected thereto for receiving the modules each in a plurality of different positions, and control and address means connected within the visual display means and to at least some of the bus lines to selectively connect the modules to the display means for performing the various functions at predetermined intervals.

Because each of the modules can be received in any of a plurality of positions in the module receptacle of the visual display device, the operator of the visual display system can select any of a plurality of functions by simply plugging in the modules for the functions. Further, if at the time of purchasing the system the operator does not wish to utilize all of the functions, he need only purchase the functions which he wishes to use at that time. If the operator wishes to use additional functions at any time in the future he can purchase the additional modules as they are needed. In this manner the operator or purchaser realizes a substantial savings since he need only purchase the modules for the various functions when or if needed. The present system is highly versatile and adaptable since each operator can incorporate more than one module for a particular function, if required, and eliminate other functions which are not required.

It is an object of the present invention to provide an improved visual display system.

It is a further object of the present invention to provide a highly versatile and adaptable visual display system which can be quickly and easily prepared for performing any or all of a variety of functions or for performing at least some functions a plurality of times.

It is a further object of the present invention to provide a visual display system wherein each function is incorporated into a module and the modules are receivable in a receptacle which is bus organized so that each module is receivable in any of a plurality of positions in the receptacle.

It is a further object of the present invention to provide a visual display system incorporating address means for addressing any desired module to display information from the module even though the module is in any of a plurality of positions in a module receptacle.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
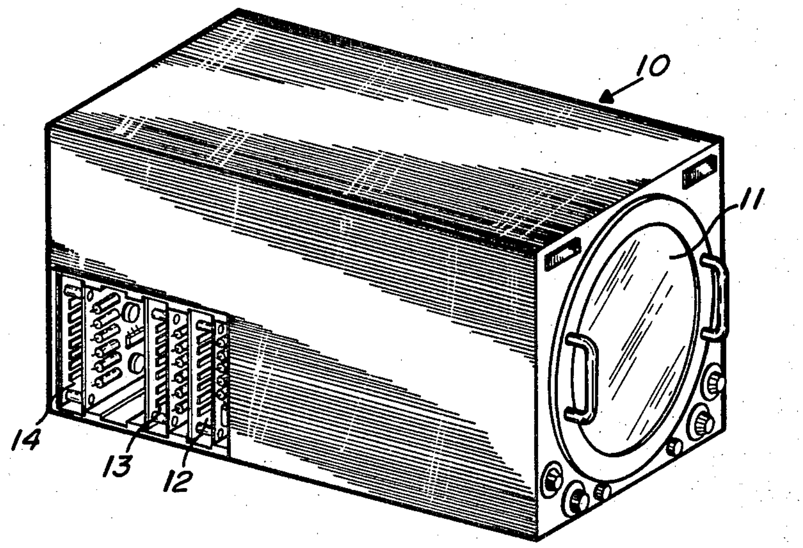
FIG. 1 is a view in perspective of a visual display system incorporating an embodiment of the invention.

Referring to FIG. 1, a display system, generally designated 10, is illustrated, which system includes a display device, in this instance a cathode ray tube (CRT) 11 and its associated deflection circuitry, control and address means, which in this embodiment includes the front panel controls and an internal computer, and a plurality of bus organized modules 12, 13 and 14. The deflection circuitry of the CRT, in this embodiment, includes a standard CRT deflection yoke for providing raster scans and the like, and a CRT symbol deflection yoke providing a special display by the stroke technique using a modified star burst technique which allows the CRT beam to be deflected in any of sixteen directions from the beam starting position and terminated at any one of four lengths. The next stroke starts from this position and is again deflected in any of sixteen directions and terminated at any of four lengths. This process is repeated as many times as is required to form the character or symbol design chosen. It should of course be understood that other deflection techniques and methods might be utilized by those skilled in the art. In the present embodiment the control and address means includes front panel controls and an internal computer, however, it should be understood that the computer might be replaced by a keyboard, external computer, or any other means of providing the desired control functions, which functions will become apparent from the following disclosure.

A space is provided in the housing or chassis of the system 10 for receiving the modules 12, 13 and 14. The space has a receptacle 20 (see FIG. 2) fixedly connected therein, as will be described presently. The receptacle 20 defines a plurality of positions for receiving a plurality of the modules in engagement therewith. While only three modules 12, 13 and 14 are illustrated in engagement with the receptacle 20 in FIG. 1, it will become apparent from the following disclosure that any desired number and variety of modules might be engaged in the receptacle 20. Further, it will be understood that the space and receptacle 20 for receiving the modules is positioned at the lower rear corner of the system 10 simply for illustrative purposes and will be positioned at the most convenient and accessible area by those skilled in the art.

Figure 2:
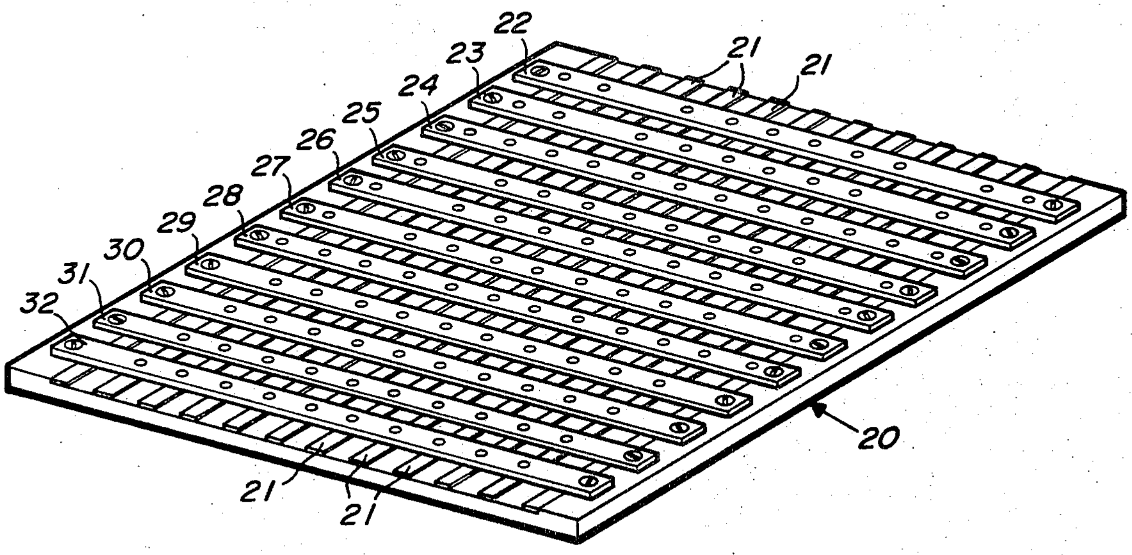
FIG. 2 is a view in perspective of an embodiment of a bus organized receptacle utilized in the system of FIG. 1.

Referring to FIG. 2, an exemplary receptacle 20 is illustrated in detail for explanatory purposes. The receptacle 20 consists of a plurality of bus lines 21, having access terminals at either end thereof, with a plurality of individual circuit board sockets (in the present embodiment eleven) 22–32 extending perpendicularly thereacross and connected thereto. Board sockets 22 and 23 are connected to the bus lines 21 in a similar fashion (all electrical connections are paralleled) so that any of a first plurality of modules may be interchangeably engaged therein. Board sockets 24 and 28 are connected to the bus lines 21 so as to each receive therein only a specific module. Board sockets 25, 26 and 27 are connected to the bus lines 21 in a similar or parallel circuit so that any of a second plurality of modules may be interchangeably engaged therein. Board sockets 29, 30, 31 and 32 are connected to the bus lines 21 in a similar or parallel circuit so that any of a third plurality of modules may be interchangeably engaged therein. It should be understood that a specific configuration of receptacle 20 is illustrated for exemplary purposes and those skilled in the art will devise a variety of means for connecting the modules to the bus lines. Further, while several varieties of modules are utilized, each variety of which is interchangeably engageable in a variety of positions in the plug 20, it should again be understood that these are illustrated for exemplary purposes and any of a variety of configurations may be devised by those skilled in the art.

Figure 3:
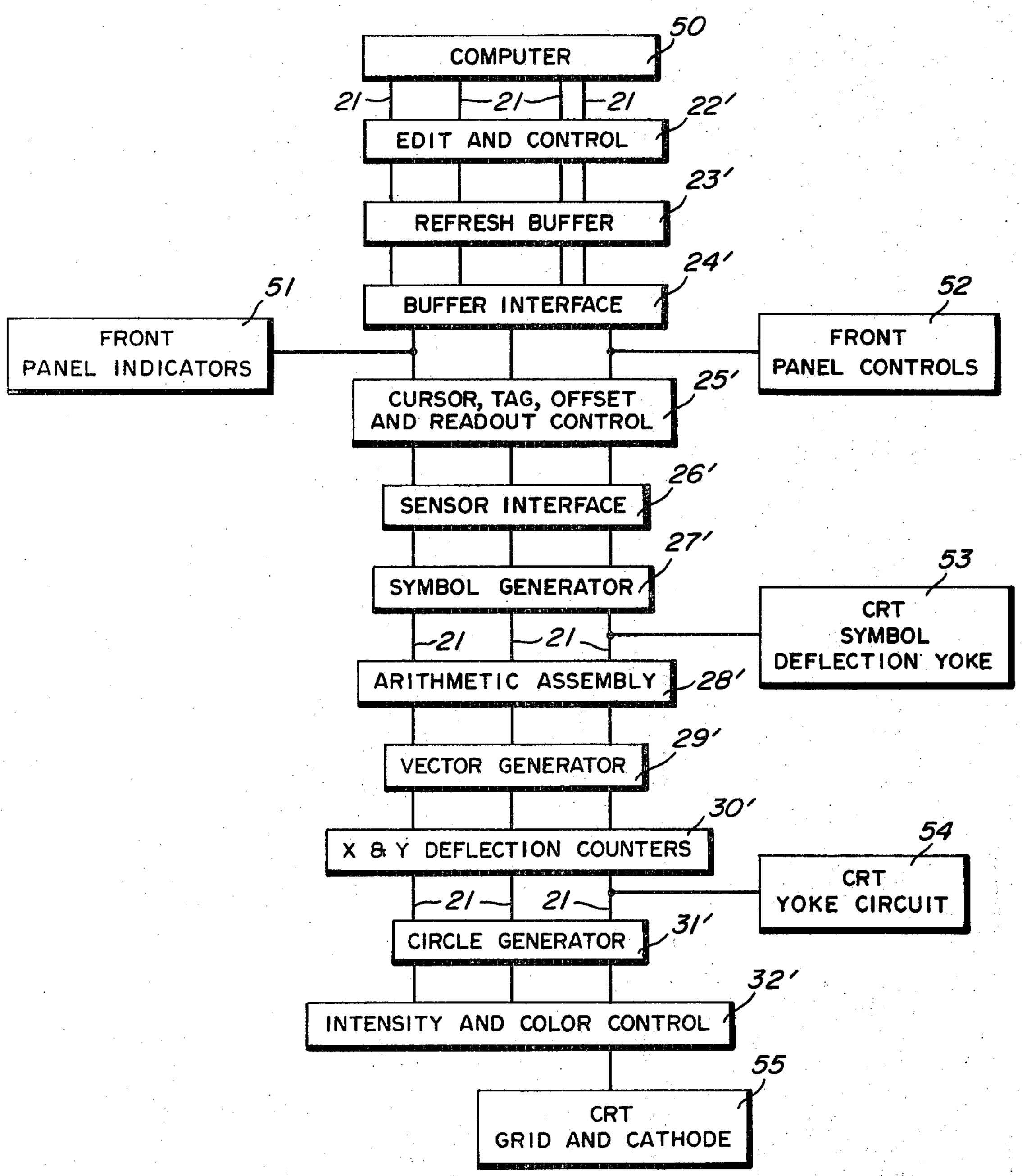
FIG. 3 is a block diagram of the display system illustrated in FIG. 1, illustrating the bus organized modules.

Referring to FIG. 3, a block diagram of components of the display device and a plurality of modules each performing a different function and organized in accordance with the configuraton of receptacle 20 in FIG. 2 is illustreated. In FIG. 3 the bus lines 21 are illustrated by somewhat heavier lines and are offset between the different groups of parallel positions to indicate the boundaries between groups of positions within which modules are interchangeable. Eleven modules, designated 22′ through 32′, are illustrated and oriented to be received in the eleven board sockets 22 through 32 of the receptacle 20. The modules 22′–32′ used in the present embodiment for exemplary purposes are as follows.

Module 22′ includes an edit and control circuit capable of editing or manipulating data applied to the display device. The module 23′ is a refresh buffer circuit which is in essence a memory for the data being applied to the display device and operates to retain information displayed on the display device until the information is altered or removed. The edit and control circuit 22′ operates in conjunction with the refresh buffer 23′ to remove or alter information applied to the display device. The modules 22′ and 23′ are interchangeable and, while only two positions are illustrated in the first group of modules, it will of course be understood that additional board sockets may be added for additional refresh buffers 23′ and/or edit and control circuits 22′ if desired.

A computer 50 is connected to the bus lines 21 at the end thereof adjacent the edit and control circuit 22′ and is utilized as the control and address means. The computer 50 aids in controlling the operaton of the various modules and interfacing the control with external controls and connections. Further, the computer 50 addresses the various modules to connect them into the bus lines at appropriate times and to time share the display device with the functions of the various modules so that all of the functions of the various modules are displayed at the appropriate times.

The buffer interface module 24′ is simply an interface between the computer 50, edit and control circuit 22′ and the refresh buffer 23′. If the edit and control circuit 22′ and refresh buffer 23′ are left out of the circuit completely the buffer interface 24′ becomes the computer 50 interface, provided the application calls for the computer 50 to supply the refresh and edit control functions.

A cursor, tag, offset and readout control module 25′, a sensor interfaced module 26′, and a symbol generator module 27′ are positioned in the board sockets 25, 26 and 27, respectively. The titles of each of these modules are self-explanatory and each of these modules are interchangeable among the three board sockets provided. Additional board sockets may be provided within this group so that additional modules of any of the three illustrated, or other modules not illustrated, may be incorporated in the system. Further, it will be understood that less modules, or no modules may be provided in this group if less or none of the various functions are desired. Front panel indicators 51 and front panel controls 52 are connected to the bus lines 20 between the buffer interface 24′ and the second group of positions including the board sockets 25, 26 and 27. Further, a cathode ray tube symbol deflection yoke 53 is connected to the bus lines 21 within the second group of positions. The symbol deflection yoke provides the stroke technique of display previously described and is utilized in conjunction with the various modules received in the second group of positions.

An arithmetic assembly module 28′ is positioned in the board socket 28 and this module is not interchangeable with any other modules in the present embodiment. The arithmetic assembly 28′ provides the operator with the capability of performing various arithmetic functions.

A vector generator module 29′, X and Y deflection counters module 30, a circle generator module 31′ and an intensity and color control module 32′ are positioned in board sockets 29, 30, 31 and 32, respectively. Each of these modules 29′–32′ are interchangeable in any of the board sockets 29–32 and additional modules may be added (or some of the modules subtracted) if additional or less functions, or a plurality of any of the described functions, are desired. A cathode ray tube yoke circuit 54 and cathode ray tube grid and cathode circuits 55 are connected to the bus lines 21 in the third group of positions (board sockets 29–32). Each of the functions provided by the modules in the third group of positions operates on the circuits 54 and 55 to provide the desired displays.

Thus, a complete display system is disclosed which is capable of performing a large number of functions, the circuit for each function being contained within a module which is receivable in a bus organized receptacle. The receptacle may be expanded or reduced to provide more or less positions for additional or fewer modules and, thus, more or less functions as desired. Further, a plurality of modules are interchangable in a plurality of positions so that a single function can be expanded without increasing the size of the circuit board of the module. Further, a plurality of modules can be available for insertion into one or two positions when only one or two functions are desired simultaneously but a plurality of functions are desired at different times. Thus, each visual display system can be quickly and easily tailored to each operator's desires and any future expansion, or additional functions required, can be quickly incorporated into the system with a minimum of cost. Many other advantages will be apparent to those skilled in the art. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A visual display system comprising:

a. visual display means;

b. a plurality of modules each incorporating circuits connected to a plurality of contacts for performing different functions when properly addressed;

c. a plurality of bus lines having means associated therewith for connecting the contacts of each of said modules to said bus lines, at least some of said bus lines being connected to said display means for supplying deflection signals to said display means;

d. control and address means connected to at least some of said bus lines for supplying control and address signals to said modules to selectively couple the functions of selected modules through said bus lines to the display means; and e. said means associated with the bus lines includes a receptacle having a plurality of module receiving positions with each of a plurality of modules being receivable in a plurality of said positions.

2. A visual display system as claimed in claim 1 wherein the visual display means includes a cathode ray tube.

3. A visual display system as claimed in claim 1 wherein the control and address means includes computer means for time sharing the display means with a plurality of modules to provide a plurality of simultaneous visual displays on the display means.

* * * * *